(12) United States Patent
Aljadeff et al.

(10) Patent No.: US 7,729,707 B2
(45) Date of Patent: Jun. 1, 2010

(54) METHOD AND SYSTEM FOR SYNCHRONIZATION OFFSET REDUCTION IN A TDOA LOCATION SYSTEM

(75) Inventors: Daniel Aljadeff, Kiriat Ono (IL); Reuven Amsalem, Nes-ziona (IL); Amir Lavi, Rehovot (IL)

(73) Assignee: AeroScout, Inc., Rehovot (IL)

( * ) Notice: Subject to any disclaimer, the term of this patent is extended or adjusted under 35 U.S.C. 154(b) by 769 days.

(21) Appl. No.: 11/552,211

(22) Filed: Oct. 24, 2006

(65) Prior Publication Data
US 2008/0095131 A1 Apr. 24, 2008

(51) Int. Cl.
*H04W 24/00* (2009.01)
(52) U.S. Cl. .............. 455/456.1; 455/456.2; 455/456.3; 455/456.5; 455/456.6; 455/560; 342/450; 370/331
(58) Field of Classification Search .............. 455/404.2, 455/456.1, 456.2, 456.3, 456.5, 456.6; 342/450; 370/331
See application file for complete search history.

(56) References Cited

U.S. PATENT DOCUMENTS

2004/0072582 A1* 4/2004 Aljadeff et al. .......... 455/456.1

OTHER PUBLICATIONS

Gunther, Andre and Hoene, Christian, Measuring Round Trip Times to Determine the Distance Between WLAN Nodes, 2005, Internation Federation for Information Processing, Networking 2005, pp. 768-779.*

* cited by examiner

*Primary Examiner*—Dwayne Bost
*Assistant Examiner*—Pierre-Louis Desir
(74) *Attorney, Agent, or Firm*—Jeffrey D. Moy; Weiss & Moy, P.C.

(57) ABSTRACT

A method for reducing synchronization offset errors in a TDOA location finding wireless system, comprising: receiving transmissions from at least one sync unit at multiple location transceivers, wherein the multiple location transceivers are synchronized from the sync unit; determining actual times-of-arrival of the received transmissions in response to receiving transmissions; performing a wireless distance measurement between the transceivers and the at least one sync unit, the wireless distance measurement performed by the transceivers in response to the received transmissions from the at least one sync unit; computing an actual propagation time between the sync unit to the transceivers; computing differences between the actual propagation time and theoretical propagation time determined in conformity with the predetermined locations; estimating synchronization offset error of the transceivers in conformity with the computed differences; and correcting the synchronization offset error.

26 Claims, 8 Drawing Sheets

METHOD AND SYSTEM FOR SYNCHRONIZATION OFFSET REDUCTION IN A TDOA LOCATION SYSTEM

RELATED APPLICATION

The present application relates to U.S. Pat. No. 6,968,194 entitled, "METHOD AND SYSTEM FOR SYNCHRONIZING LOCATION FINDING MEASUREMENTS IN A WIRELESS LOCAL AREA NETWORK" and U.S. patent application Ser. No. 10/225,267, filed on Aug. 20, 2002, and entitled "METHOD AND SYSTEM FOR LOCATION FINDING IN A WIRELESS LOCAL AREA NETWORK". The above are incorporated by reference into the present patent application.

FIELD OF THE INVENTION

The present invention relates generally to wireless networks, and more specifically, to a method and system for reducing synchronization offsets, normally found in TDOA wireless location finding systems.

BACKGROUND OF THE INVENTION

A multitude of wireless communications systems are in common use today. Mobile telephones, pagers and wireless-connected computing devices such as personal digital assistants (PDAs) and laptop computers provide portable communications at virtually any locality. Wireless local area networks (WLANs) and wireless personal area networks (WPANs) according to the Institute of Electrical and Electronic Engineers (IEEE) specifications 802.11 (WLAN) (including 802.11a, 802.11b/g, 802.11n, etc.), 802.15.1 (WPAN) and 802.15.4 (WPAN-LR) also provide wireless interconnection of computing devices and personal communications devices, as well as other devices such as home automation devices.

Within the above-listed networks and wireless networks in general, it is desirable to know the location of devices for operation of location-based services, mapping of network facilities, and security. The above-incorporated parent applications describe a method and system for synchronizing location finding measurements in a wireless local area network and a system for location finding within a wireless network. In both applications, the method and system use the time-difference-of-arrival (TDOA) of a transmitted signal received at multiple receivers within a wireless network in order to determine the position of the transmitting device via triangulation.

In the TDOA location finding system described above, synchronization of devices is essential so that accurate TDOA measurements are made between the network devices. Synchronization in the above-referenced parent application is achieved by continuously estimating the drift and difference between clocks of each of the location-finding units in a server or central processor.

Hard-wired synchronization schemes may distribute a clock from a central source, but distribution of a clock is a costly alternative to synchronization. Hard-wired schemes that pass synchronization error information over a wired network connection as well as wireless synchronization schemes are preferable, but rely on stability and accuracy of the local clock in each location receiver.

Synchronization of clocks by TOA measurement of wireless messages transmitted by units at known locations is valuable but can cause synchronization errors due to offsets. Those offsets are commonly caused by multipath and/or indirect path signals which lead to TOA measurement errors. When those offsets are constant over time they are hard to detect since they are interpreted by the system as initial offsets of the clocks. In some systems, it is possible to cancel this offset by an initial calibration but those offsets tend to change over time.

Therefore, it would be desirable to provide a method and system for continuously and accurately measuring and reducing synchronization offset errors within a TDOA-based location finding system that also introduces little or no synchronization overhead.

SUMMARY OF THE INVENTION

In accordance with one embodiment of the present invention, a method for reducing synchronization offset errors in a TDOA location finding wireless system is disclosed. The method comprising: receiving transmissions from at least one sync unit at multiple location transceivers, wherein the multiple location transceivers are synchronized from the sync unit; determining actual times-of-arrival of the received transmissions in response to receiving transmissions; performing a wireless distance measurement between the transceivers and the at least one sync unit, the wireless distance measurement performed by the transceivers in response to the received transmissions from the at least one sync unit; computing an actual propagation time between the sync unit to the transceivers; computing differences between the actual propagation time and theoretical propagation time determined in conformity with the predetermined locations; estimating synchronization offset error of the transceivers in conformity with the computed differences; and correcting the synchronization offset error.

In accordance with another embodiment of the present invention, a TDOA location finding wireless system is disclosed. The system has at least one sync unit for providing reference sync transmissions. A plurality of location transceivers is provided. Each location transceiver including a timebase for detecting actual times-of-arrival of periodic reference sync transmissions. Each of the plurality of transceivers is located at predetermined locations with respect to the at least one sync unit. The plurality of location transceivers are able to perform wireless distance measurement with the at least one sync unit. A processor is provided and is coupled to a memory. The memory contains program instructions for execution by the processor. The program instructions comprise program instructions for: computing an actual propagation time between the sync unit to the plurality of transceivers; computing differences between the actual propagation time and theoretical propagation time determined in conformity with the predetermined locations; estimating synchronization offset error of the plurality of transceivers in conformity with the second computed differences; and correcting the synchronization offset error.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, as well as a preferred mode of use, and advantages thereof, will best be understood by reference to the following detailed description of illustrated embodiments when read in conjunc

DESCRIPTION OF PREFERRED EMBODIMENT

The present invention provides a system and method for continuously and accurately measuring and reducing synchronization offset errors within a TDOA-based location finding system. The method is embodied in a system which consists of multiple location transceivers at known positions and at least one synchronization unit (sync unit) at a known position used to wirelessly synchronize the location transceivers. The synchronization unit can be an Access Point or another location transceiver.

The synchronization unit transmits wireless messages (e.g. beacon messages) which are received by each of the location transceivers. Each location transceiver measures the TOA of the received synchronization messages and reports it to a server.

In addition to measuring the TOA of the received synchronization messages, each transceiver performs (e.g. one at a time) a distance measurement (DM) process with the synchronization unit. The distance measurement process is performed by measuring the TOA of the transmitted and received messages on both units and calculating the distance based on the actual propagation time of the signals. Since the real distance between both units is known, it's possible to calculate the additional propagation time offset added by multipaths or any other reason.

A server processing all the measured and reported TOA's values of the synchronization messages as well as the DM results from each of the transceivers can estimate the synchronization offset error and then synchronize the transceivers clocks and significantly reduce the synchronization offset errors due to multipaths, indirect paths or any other type of interference.

The DM measurements are preferably performed periodically thus allowing continuous estimate and correction of synchronization offsets.

Kalman or other statistical filters may be employed to smooth the measurements and also to predict the synchronization error when it varies over time.

Figure 1:
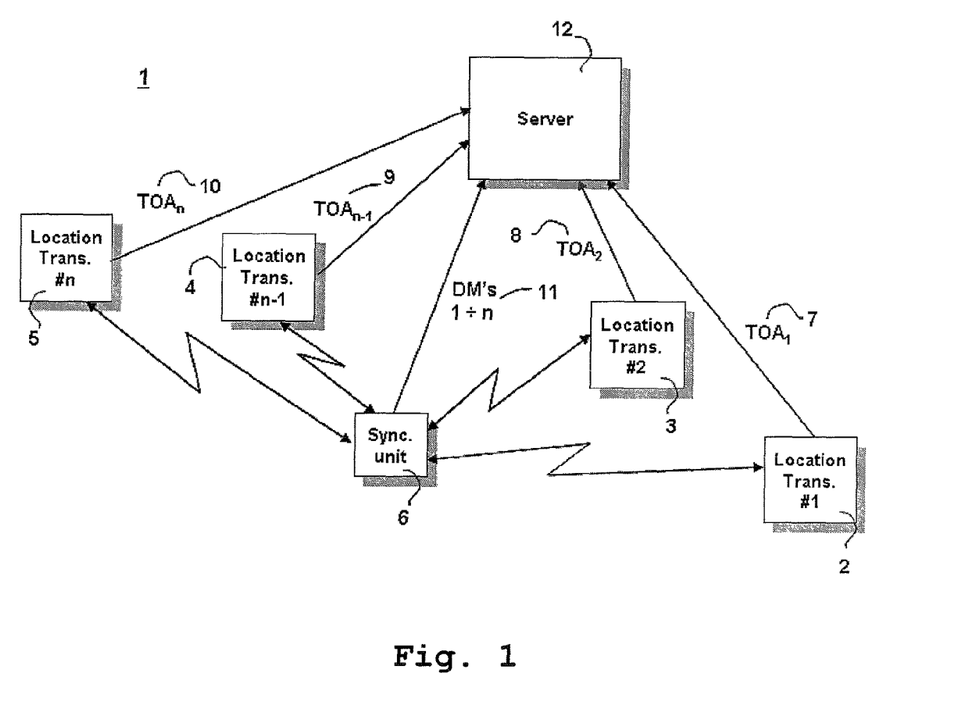
- FIG. 1 is a pictorial diagram depicting a wireless network organized in accordance with an embodiment of the present invention.

Referring now to the figures and in particular to FIG. 1, a wireless network 1 within which the present invention is embodied is depicted in a pictorial diagram. Fixed-position location transceivers within the wireless network are associated in a group, although not necessarily all fixed-position location transceivers within wireless network 1 will be assigned to any group.

According to the embodiment of the network as depicted in FIG. 1, it consists of one sync unit 6 and N location transceivers 2-5 (typically N=2 to 100) which are in wireless communication with the sync unit 6 and where all units (sync unit and location transceivers) have data communication (wired or wireless) with a server 12.

Location transceivers 2-5 are wirelessly synchronized through synchronization messages transmitted by the sync unit 6. Each sync message transmitted by the sync unit 6 is received by each of the location transceivers 2-5, each of them measuring the TOA 7-10 of the received message and reporting it to a server 12.

Each sync message broadcasted by sync unit 6, is also used to perform a distance measurement with one of the location transceivers 2-5. The distance measurement process is performed by each of the location transceivers 2-5 based on the identification of a location transceiver ID (e.g. MAC address) included in the sync message itself. The distance measurement results 11 are reported to the server 6 by the sync unit 12.

Figure 2:
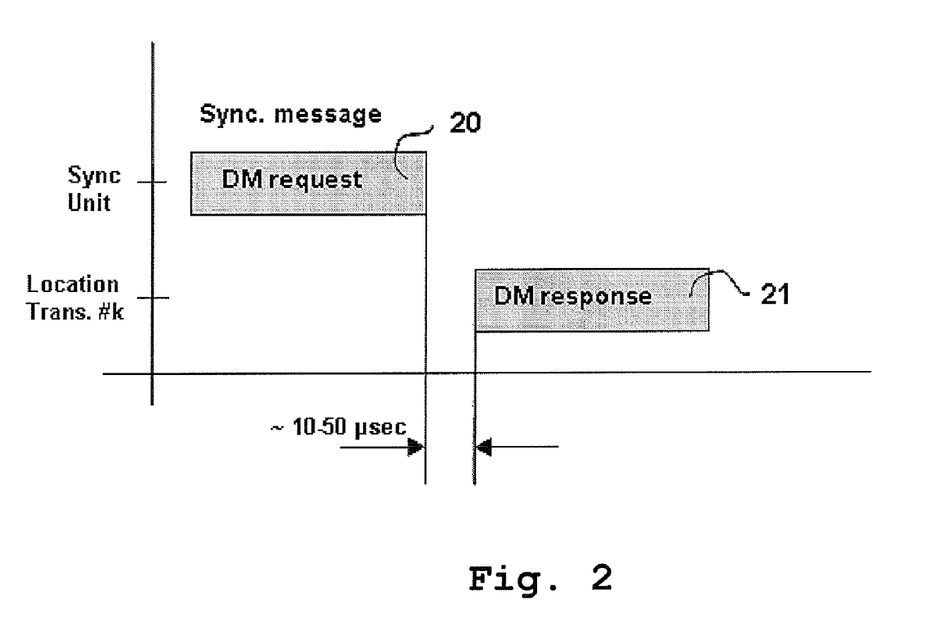
FIG. 2 is a diagram showing the basic elements of a Distance Measurement (DM) process in accordance with an embodiment of the present invention.

Referring to FIG. 2, A DM process is composed of two phases: DM request 20 and DM response 21. According to one embodiment of the present invention, the DM request message 20, is the same sync message broadcasted to all the location transceivers being synchronized by a sync unit which also includes a reference to a specific location transceiver, the reference for the purpose of performing a distance measurement between the sync unit and the specific location transceiver.

The interval between the DM request 20 and the DM response 21 is short and typically in the range of 10-50 μsec. In WLAN network operating according to a revision of the IEEE 802.11 specification, the DM request message 20 (e.g. the beacon message) may also include a request to reserve the channel for the DM response 21, thus ensuring a clear channel when the DM response 21 needs to be transmitted and minimum delay between the DM request 20 and DM response messages 21.

Figure 3:
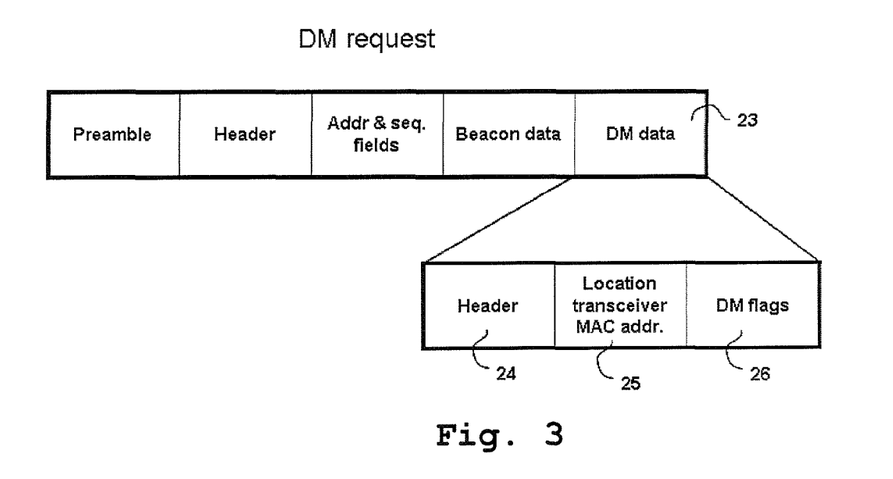
FIG. 3 is a picture showing the basic format of a Distance Measurement (DM) request message in accordance with an embodiment of the present invention.

Referring now to FIG. 3 and according to an embodiment of the present invention, the DM request message is based on a standard IEEE 802.11 WLAN beacon message which also includes a DM data field 23. The DM data field 23, is optional and is added to the beacon message only when a DM measurement is requested by the sync unit.

The contents of the DM data field 23 in a preferred embodiment of this invention, is also depicted in FIG. 3 and it includes a header 24 which typically consist of a field code or element ID and field length, the MAC address of the location transceiver requested to perform DM 25 and DM flags 26 which include information regarding the DM operation (e.g. DM type, antenna used, reported fields, etc.).

Figure 4:
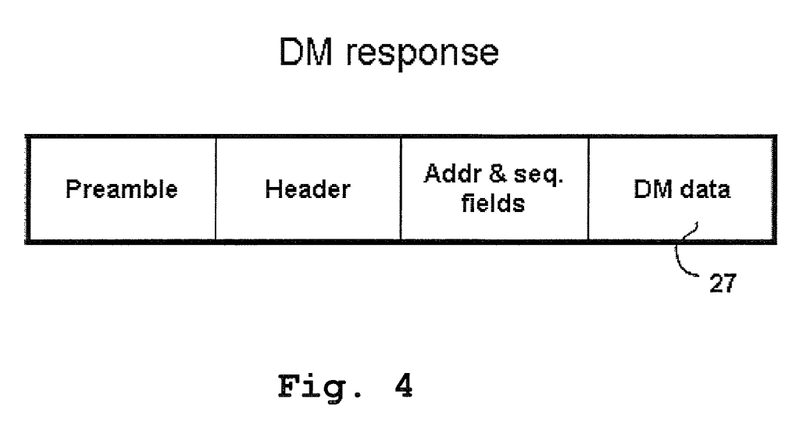
FIG. 4 is a picture showing the basic format of a Distance Measurement (DM) response message in accordance with an embodiment of the present invention.

Referring to FIG. 4, the DM response is a data message including a preamble, header, address and sequence fields and DM data 27. The DM data 27 includes information produced by the location transceiver which will be used later to calculate the distance between the sync unit and the location transceiver.

This data includes the TOA of the DM request message and the TOA of the DM response message. In another embodiment the DM data 27 field includes the time interval between the reception of the DM request and the transmission of the DM response. To the skilled in the art, it may be obvious that many other embodiments of this DM data field may be implemented.

Figure 5:
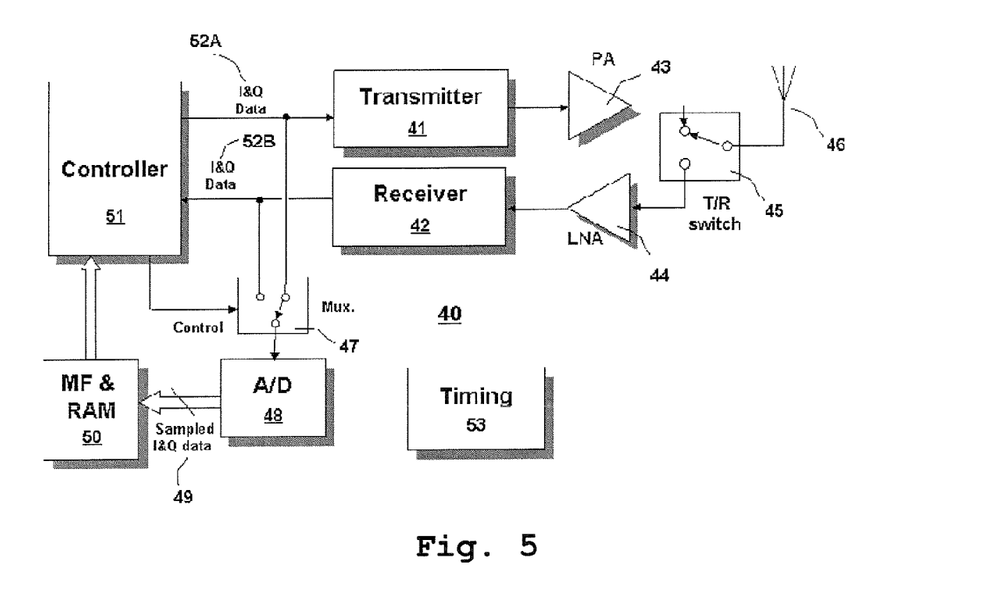
FIG. 5 is a block diagram of the DM section of a location transceiver or sync unit in accordance with an embodiment of the present invention.

Referring now to FIG. 5, it shows the principal blocks 40 of the DM section of a preferred embodiment of the location transceiver as well as the sync unit. The DM section 40 includes an RF transmitter 41 section and a receiver 42 section. In normal transmit operating mode, the controller 51 prepares a message to transmit and converts the data to In-phase and Quadrature (hereinafter I&Q) signals 52A which are fed to the transmitter unit 41. The I&Q signals 52A are modulated and transmitted at a carrier frequency according to the selected channel. The signal is amplified by a power amplifier 43 and fed to the antenna 46 through a Transmit/Receive (hereinafter T/R) switch 45.

In normal receive operating mode, the receiver unit 42 is fed with received signals from a Low Noise Amplifier (hereinafter LNA) 44. The LNA 44 amplifies the received signals received by the antenna 46 and fed to the LNA 44 through the T/R switch 45. The output of the receiver 42 is I&Q signals 52B which are sampled and decoded to messages by the controller 51.

For the sake of simplicity, some typical functions normally found in a typical transceiver are not shown. Among others those functions include: Synthesizer, DC-DC converter, interfaces to external units, and the like.

When measuring distance, the transceiver 40 samples the I&Q signals 52B of the received message (i.e. DM request message). The IQ signals 52B are fed to an Analog to Digital (hereinafter A/D) converter 48 through a multiplexer (hereinafter MUX) 47 and sampled by the A/D converter 48. The digital sampled data is then processed by a matched filter and stored into a memory 50. The processed sampled data is then read by the controller 51 which calculates the TOA of the received message. A general timing circuit 53 synchronizes the operation of the A/D 48, the matched filter, the Random Access Memory (hereinafter RAM) 50 and the controller 51. The timing circuit 53 also generates the clock to perform time stamp of the processed samples stored in the RAM 50.

A very similar process is performed when a message is transmitted (i.e. DM response). The I&Q signals 52A are fed to the A/D converter 48 through a MUX 47. The I&Q signals 52A are processed and stored exactly in the same way as explained for the received message.

Thus, the transceiver is able to calculate the TOA of the received message as well as the TOA of the transmitted message. As can be easily understood, the same process can be performed by the sync unit in a reverse order, i.e. measuring the TOA of the transmitted message first and then the TOA of the received message. In addition, other embodiments may include a TOA measurement circuitry which is not based on a matched filter as in the embodiment mentioned above.

In accordance with one embodiment of the transceiver, the calculated TOA of the received and transmitted messages are both transmitted in the DM data field 27 of the DM response. Since the TOA of the transmitted message can be calculated from samples of the preamble, a fast processor can calculate the TOA and still have enough time to transmit this data as part of the message being transmitted.

In another embodiment, the measured TOA values from both the sync unit and location transceiver are sent to a central server which uses those measurements to calculate the distance and perform the sync offset correction. In that case, the location transceiver has no need to transmit the measured TOA values in the DM data field 27 of the DM response message.

Figure 6:
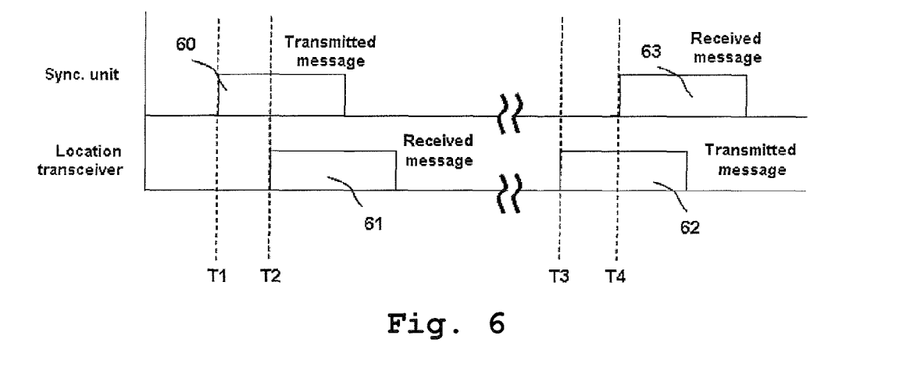
FIG. 6 is a diagram depicting the timing of a single Distance Measurement operation in accordance with an embodiment of the present invention.

Referring to FIG. 6, the timing of a single DM operation is explained. The TOA (T1) of the transmitted message 60 (i.e. beacon or DM request) is measured by sync unit. The transmitted message is received 61 by the location transceiver after a propagation time which also measures the TOA (T2). After a short interval (e.g. 10-50 μsec), the location transceiver transmits a DM response message 62 and at the same time measures its TOA (T3). As previously explained this TOA can be measured on the message preamble. In a preferred embodiment the DM response message includes the T2 and T3 data or the difference between them. After a propagation time, the DM response message is received 63 by the sync unit which measures the TOA (T4) of the received message.

As can be easily seen from FIG. 6 the TOA is measured at the same point in the message (e.g. end of the preamble) regardless if the message is being transmitted or received by the unit.

Since in a preferred embodiment the TOA is measured on a baseband signal (I&Q signals) and not at the antenna, it is necessary to take in account the delay of the RF circuitry to avoid measurement errors.

Therefore:

$T_a1 = T1 + Tx$ $T_a2 = T2 - Tr$ $T_a3 = T3 + Tx$ $T_a4 = T4 - Tr$

Where:

Tx: Time delay of the transmission path (i.e. from the sampled I&Q signals to the antenna)

Tr: Time delay of the reception path (i.e. from the antenna to the sampled I&Q signals)

In a preferred embodiment it is assumed that the delay of the transmission path in both the sync unit and location transceiver is equal, and also the reception path delay is equal in both units.

Since the location transceiver responds very fast (e.g. 10-50 μsec) after the DM request has been received 61, it can be assumed with a high degree of confidence that the propagation path of the DM request and the DM response are almost equal. This assumption is essentially true since in this very short time nothing can move too much, nor the environmental conditions that may alter the propagation path.

For this reason it can be assumed that:

$T_a2 - T_a1 = T_a4 - T_a3 = \text{Propagation time}$

Since the TOA values calculated by the sync unit and the location transceiver are unsynchronized (each unit has its own free running clock and the time stamps are not synchronized), it is not possible to subtract T2 from T1 to calculate the propagation time and then the distance.

Therefore, after all the measured TOA values of a single DM have reached a central point (i.e. sync unit or server), the following calculation can be done:

$T_s = T4 - T1$ $T_t = T3 - T2$

Where:

$T_s$: Time interval measured by the sync unit, elapsed between the transmission of the DM request to the reception of the DM response (e.g. end of preamble taken as the point of reference).

$T_t$: Time interval measured by the location transceiver, elapsed between the reception of the DM request to the transmission of the DM response (e.g. end of preamble taken as the point of reference).

Therefore:

$$T_s = T_a4 + Tr - T_a1 + Tx = (T_a4 - T_a1) + (Tx + Tr)$$

$$T_t = T_a3 - Tx - T_a2 - Tr = (T_a3 - T_a2) - (Tx + Tr)$$

Subtracting the above equations, we get:

$$(T_a4 - T_a1) - (T_a3 - T_a2) = (T_s - T_t) - 2*(Tx + Tr)$$

Or, $$(T_a4 - T_a3) + (T_a2 - T_a1) = (T_s - T_t) + 2*(Tx + Tr)$$

Since we assume: $T_a2 - T_a1 = T_a4 - T_a3$,
we can write:

$$T_p = T_a2 - T_a1 = [(T_s - T_t)/2] + (Tx + Tr)$$

Where:

$T_p$: Propagation time of the messages between the sync unit and the location transceiver.

The term (Tx+Tr) is the total delay of the RF section (receiver and transmitter together). We can assume that the sync unit and the location transceivers use similar or identical RF circuitry which has the same delay. Note that this term can be easily measured during an initial calibration, by measuring the distance of two units at zero distance (connected back to back). Since the propagation time is very close to zero, all the delay can be attributed to the RF delay. The main advantage is there is no need to know Tx and Tr separately.

Having the measured propagation time, the distance between the units can be easily calculated. Since the measured time may be longer than the theoretical time (direct line propagation) due to multipaths and/or objects that can block the direct path waves, the calculated distance will reflect any difference between the measured propagation time and the theoretical propagation time. As will be seen later, this error will be used to reduce the sync offset error.

To the skilled in the art, it will be clear, that in practical implementations, the exact frequency of the location transceiver clock is unknown to the sync unit or to the server and therefore the term: $T_t = T3 - T2$, may have a small error.

To estimate this error, let assume that the location transceivers use clock oscillators with an accuracy of ±2 ppm over the full temperature range. Since the interval between receiving a DM request to transmitting a DM response is relatively short (10-50 μsec), the error in the time measurement due to the inaccuracy of the location transceiver clock will be ±0.02 nsec to ±0.1 nsec. Even increasing the T3–T2 interval to 200 μsec and the clock error to ±5 ppm will yield a ±1 nsec error which is insignificant in this type of systems.

However, in case this error becomes significant, the actual frequency of the location transceiver clock can be estimated by measuring the carrier offset of the location transceiver to a more accurate clock (e.g. the clock of the sync unit).

Figure 7:
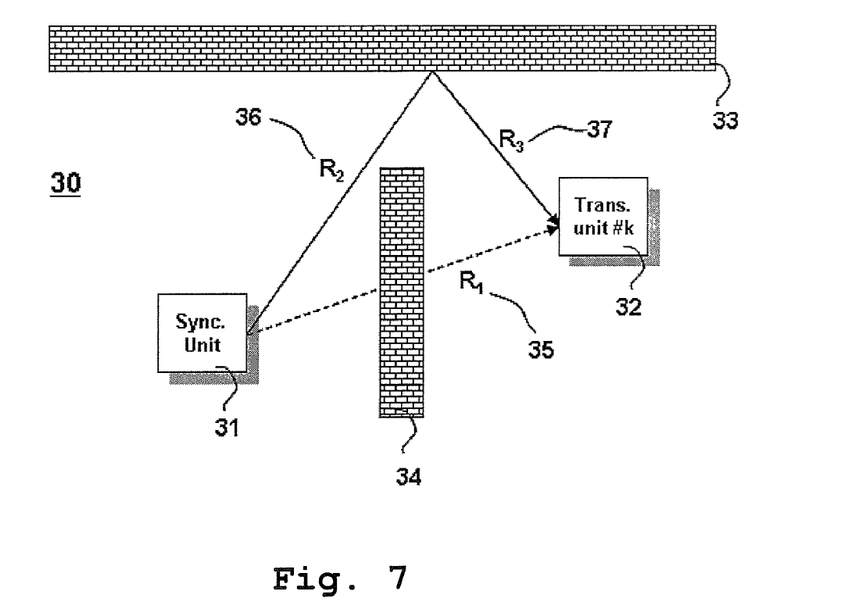
FIG. 7 is a picture showing the offset synchronization problem generated by multipaths or indirect paths basic and which is solved by using a Distance Measurement (DM) process in accordance of the present invention.

Now referring to FIG. 7, the generation of synchronization offsets in a typical environment 30 is explained. A sync unit 31 (e.g. an IEEE 802.11 WLAN AP) transmits beacons used for wireless synchronization which are received by the location transceiver 32. The beacon signal cannot reach directly the antenna of the location transceiver 32, since it is blocked by a wall 34 that strongly attenuates the signal. A second path of the transmitted signal is reflected by another wall 33 and this reflection is well received by the location transceiver 32.

It's clear that a wireless synchronization based on the TOA of the beacon signal will suffer from an offset proportional to the difference between $R_1$ 35 and the sum of $R_2$ 36 and $R_3$ 37. According to the present invention and one of its preferred embodiments, the location transceiver 32 performs a DM operation with the sync unit 31 as previously described. The DM operation is performed using the beacon signal as the DM request.

Therefore, according to the deployment described in FIG. 7, the measured distance will be $R_2 + R_3$ and not $R_1$ as could be expected. Since the system knows the real distance $R_1$ 35 between the sync unit 31 and the location transceiver 32, it can calculate the additional time offset that was added to the beacon due to the indirect path. This additional time offset can be easily deducted thus reducing or canceling the synchronization offset error.

One main advantage of this preferred embodiment is using the same signal (e.g. beacon message) for synchronization and for the DM operation thus avoiding additional errors and channel load.

Figure 8:
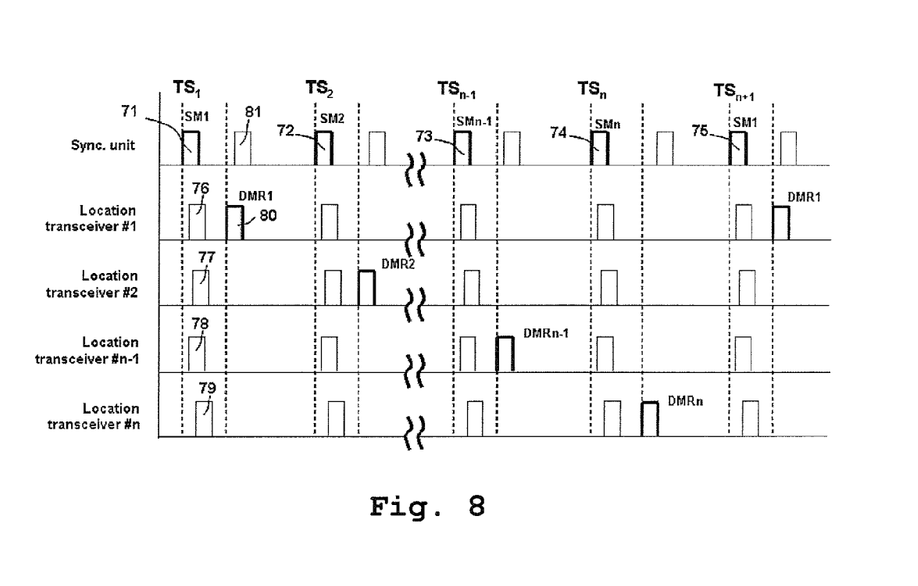
FIG. 8 is a timing diagram depicting the network synchronization messages of a system in accordance with an embodiment of the present invention.

Referring to FIG. 8, the synchronization timing diagram of a whole location system (as depicted in FIG. 1) is explained according to a preferred embodiment.

The sync unit broadcasts messages 71-75 which are used by the location transceivers (1 to n) for synchronization. According to this preferred embodiment, those broadcasted synchronization messages 71-75 are beacon messages which have a format as described in FIG. 3.

Also in accordance with this embodiment, the sync unit specifies in the DM data field of each synchronization message broadcasted (refer to FIG. 3) the MAC address of a different location transceiver.

Since this network consists of n location transceivers, the sync unit will broadcast n beacon messages each with a different DM MAC address corresponding to each of the n location transceivers. Once all the transceivers have been addressed, the sync unit will start a new cycle with location transceiver #1.

Each location transceiver being addressed in the DM field of the beacon message will perform a DM operation with sync unit as previously explained. The DM results will be transferred to the server by the sync unit or by both units separately (each unit will report its measurements).

All the other location transceivers not being addressed in the DM field will perform normal synchronization without doing a DM cycle.

Referring to FIG. 8, sync message 71 addresses location transceiver #1, which receives the sync message 76 and responds with a DM response 80 then received by the sync unit 81. Said sync message, when received by the other location transceivers 76-79, is used for normal synchronization. The next sync message 72, addresses location transceiver #2 which performs a DM cycle and so on with all the other location transceivers.

A typical beacon interval in a WLAN system is around 100 msec. Therefore, a sync unit synchronizing 10-30 units will complete a full cycle in 1-3 seconds. This means that the system can continuously monitor the sync offset from each of the location transceivers and react relatively fast to offset changes caused by environmental changes.

The server processes the DM results from all the DM operations and calculates a continuous sync offset for each of the location transceivers.

In another preferred embodiment, part of the sync messages (e.g. beacons) may not be used for any DM operation, which means that the DM data field is not included in the sync message. In another exemplary embodiment, the order of those sync-messages and the quantity of the messages per time unit, which are addressing a specific location transceiver may vary according to the sync quality of each independent transceiver. Thus it may happen that in a cycle of 3 seconds for example, some of the transceivers perform more DM operations than other transceivers being synchronized from the same source. The server can dynamically change the DM rate of each location transceiver according to the sync offset value and/or overall sync quality.

To the skilled in the art, it shall be obvious that the offset reduction can be also performed in the location transceiver itself. In a preferred embodiment of the present invention, the DM offset values calculated by either the server or the sync unit, are periodically transferred to each of the location transceivers. Said offset information is used by each of said transceivers to correct the TOA of the sync messages in accordance with said offset.

Using DM to reduce synchronization offset errors is beneficial since it is independent from errors that can be introduced when doing synchronization from multiple transmitters located in know positions. However, in a preferred embodiment of the present invention, sync offset corrections are performed by combining the DM results with the multiple source synchronization. In another preferred embodiment, one or more location transceivers maybe synchronized from more than one sync units and perform DM operations with either one or more sync units.

Since the DM results may also suffer from errors due to noise, outliers, etc., it will be desirable to filter those results as a function of time to perform a smoother offset correction. In a preferred embodiment, this filter may consist of a simple moving average, a median filter or be implemented as a statistical filter (e.g. Kalman or other statistical filters). Using a Kalman filter it also allows good prediction of the sync offset in case it significantly changes over a short period of time. Statistical filters known as Kalman Filters are employed.

A Kalman filter is an ideal Gaussian estimator in that the Kalman filter output coefficients, which are determined from sample statistics of the Kalman Filter input data, yield the best mean-square fit to a straight line. The coefficients (slope and offset) of the line are easily updated as new samples are gathered, via the Kalman filter algorithm.

Since the location transceivers have a transmitter some of them can be used as sync units in parallel to operating as location receivers.

The present invention provides an additional embodiment of a location system consisting of a plurality of location transceivers, wherein at least one of them is used to transmit sync messages (e.g. beacons) and performs DM operations with other location transceivers as previously described. In this case, the location transceiver operating also as a sync unit needs to perform self synchronization from its transmitted sync messages. One manner of accomplishing the above-mentioned self synchronization is by using the TOA of each transmitted sync message that anyway the sync transceiver measures when transmitting a sync message.

Therefore according to this preferred embodiment, a complete TDOA location system can be implemented using location transceivers wherein one or more units operate as sync units in addition to location receivers. In another preferred embodiments those location transceivers are WLAN access points enabled to perform TOA measurements.

The quality (e.g. accuracy, stability, etc.) of DM results may also be used to additional purposes than the ones already mentioned.

In a preferred embodiment, in which the sync units are location transceivers, the selection of the sync unit(s) among the location transceivers can be based on the quality of DM operations between the units. This way, the system can automatically select as sync units the transceivers with the best sync quality. This selection can also be assisted by measuring the location accuracy of tags at known positions.

In addition, and according to another preferred embodiment, the quality of the DM results is used to determine the synchronization quality. Said quality indicators may be further logged to allow examination of the sync quality over time. The sync quality can be used to adjust the interval of said sync unit transmissions.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method for reducing synchronization offset errors in a Time Difference of Arrival (TDOA) location finding wireless system, comprising:
receiving transmissions from at least one sync unit at multiple location transceivers, wherein the multiple location transceivers are synchronized from the sync unit;
determining actual times-of-arrival (TOA) of the received transmissions in response to receiving transmissions;
performing a wireless distance measurement between the transceivers and the at least one sync unit, the wireless distance measurement performed by the transceivers in response to the received transmissions from the at least one synchronization (sync) unit;
computing an actual propagation time between the sync unit to the transceivers;
computing differences between the actual propagation time and theoretical propagation time determined in conformity with the predetermined locations;
estimating synchronization offset error of the transceivers in conformity with the computed differences; and
correcting the synchronization offset error.

2. The method of Claim 1, wherein computing an actual propagation time, computing differences, estimating synchronization offset error, and correcting the synchronization offset error are continuously performed.

3. The method of claim 1, further comprising reserving a channel for transceiver transmissions in response to transmissions from the at least one sync unit.

4. The method of claim 1, wherein transmissions from the at least one sync unit is an IEEE 802.11 type beacon message, the beacon message comprising an optional distance measurement (DM) data field.

5. The method of claim 1, wherein the transceiver transmission transmitted as part of a distance measurement (DM) process includes a DM data field, the DM data field including information generated by the transceiver and related to the DM process.

6. The method of claim 1, sending DM relevant data to a server from the at least one sync unit and the transceivers, the server able to compute the synchronization offset error.

7. The method of claim 1 wherein the at least one sync unit is a location transceiver, the location transceiver performing location functions, and being self synchronized.

8. The method of claims 1, wherein the at least one sync unit is an IEEE 802.11 WLAN access point.

9. The method of claims 1, wherein said at least one location transceiver is an IEEE 802.11 WLAN TOA-enabled access point.

10. The method of claim 1, wherein only a portion of transmissions by the at least one sync unit is used for distance measurement (DM) purposes.

11. The method of claim 1, wherein a rate of distance measurement (DM) operations between at least one transceiver and the at least one sync unit is variable and dynamically programmable.

12. The method of claim 1, wherein at least one of the transceivers is synchronized from more than one sync unit.

13. The method of claim 1, further comprising:
collecting results of computing an actual propagation time and computing differences between the actual propagation time and theoretical propagation time as a sample set; and
smoothing the sample set using a smoothing filter;
wherein estimating the synchronization offset error is done using a result of the smoothing of the sample set.

14. The method of claim 1, further comprising:
collecting results of computing an actual propagation time and computing differences between the actual propagation time and theoretical propagation time as a sample set; and
determining statistics of the sample set in conformity with a statistical model;
wherein estimating the synchronization offset error is done using a predictor associated with the statistical model.

15. The method of claim 14, wherein said statistical model is a Gaussian model, and wherein the predictor is a Kalman filter.

16. The method of claim 1, further comprising transferring the estimated synchronization offset error to the transceivers, wherein correcting the synchronization offset error is performed by the transceivers in response to the estimating.

17. The method of claim 1, further comprising evaluating a quality of a result of the estimating.

18. The method of claim 17, further comprising logging a result of the evaluating in an error log at discrete intervals.

19. The method of claim 18, further comprising adjusting an interval of transmissions from the at least one sync unit in response to the evaluating.

20. A Time Difference of Arrival (TDOA) location finding wireless system, comprising:
at least one sync unit for providing reference sync transmissions;
a plurality of location transceivers, each location transceiver including a timebase for detecting actual times-of-arrival of periodic reference sync transmissions, each of the plurality of transceivers located at predetermined locations with respect to the at least one sync unit, the plurality of location transceivers are able to perform wireless distance measurement with the at least one synchronization (sync) unit; and
a processor coupled to a memory, the memory containing program instructions for execution by the processor, wherein the program instructions comprise program instructions for:
computing an actual propagation time between the sync unit to the plurality of transceivers;
computing differences between the actual propagation time and theoretical propagation time determined in conformity with the predetermined locations;
estimating synchronization offset error of the plurality of transceivers in conformity with the second computed differences; and
correcting the synchronization offset error.

21. The TDOA location finding wireless system of claim 20, wherein the program instructions for estimating comprise continuously computing, estimating and correcting the synchronization offsets errors.

22. The TDOA location finding wireless system of claim 20, wherein the program instructions for computing comprise performing a calculation based on distance measurement (DM) results received from at least one of the at least one sync unit or from the at least one sync unit and at least one location transceiver.

23. The TDOA location finding wireless system of claim 21, wherein the program instructions for estimating further comprise predicting values of the offset error as a function of time, wherein the program instructions for correcting further comprises correcting the synchronization offset error in conformity with the predicted error.

24. The TDOA location finding wireless system of claim 20, wherein said program instructions further comprise:
collecting a result of the computing as a statistical sample set; and
determining statistics of the sample set in conformity with a statistical model;
wherein the estimating comprises predicting the error using a predictor associated with the statistical model.

25. The TDOA location finding wireless system of claim 20, wherein said program instructions further:
collecting a result of said computing as a sample set; and
smoothing the sample set using a smoothing filter;
wherein the estimating comprises predicting the error using a result of the smoothing.

26. The TDOA location finding wireless system of claim 20, wherein said processor and said memory are located in a server coupled in a communications link to the at least one sync unit and to the plurality of transceivers, whereby the server estimates the error.

* * * * *